United States Patent [19]

Prescott

[11] 3,981,318

[45] Sept. 21, 1976

[54] PNEUMATIC OUTPUT SIGNAL LIMITING DEVICE

[75] Inventor: Robert C. Prescott, Foxboro, Mass.

[73] Assignee: The Foxboro Company, Foxboro, Mass.

[22] Filed: Feb. 3, 1975

[21] Appl. No.: 546,573

[52] U.S. Cl. ................................... 137/86; 137/82
[51] Int. Cl.² ........................................ G05D 16/00
[58] Field of Search ................... 137/82, 84, 85, 86

[56] References Cited
UNITED STATES PATENTS

| | | | |
|---|---|---|---|
| 2,737,963 | 3/1956 | Gorrie et al. | 137/85 |
| 2,884,940 | 5/1959 | Gorrie | 137/82 X |
| 2,917,064 | 12/1959 | Hunter | 137/85 |
| 2,973,772 | 3/1961 | Oglesby | 137/82 |
| 3,814,119 | 6/1974 | Bertrand et al. | 137/82 X |

*Primary Examiner*—Alan Cohan
*Assistant Examiner*—Gerald A. Michalsky
*Attorney, Agent, or Firm*—F. J. Fleming

[57] ABSTRACT

A pneumatic output signal limiting device utilizing a planar-type construction having a balance beam with a passage extending through the area of its pivotal axis to provide communication between side-by-side chambers and arranged so that the balance beam moves into contact with a valve in the output chamber to close the passage and further movement in the same direction open a vent. In operation, the output signal equals the input signal when the input signal is within one limit of a preselected output signal operating range. When the input signal equals the limit, the passage is closed and the output signal is maintained equal to the limit. The passage remains closed when the input is outside the limit and the output signal is maintained equal to the limit until the input signal is a preselected value outside the limit. Then the balance beam moves in the same direction to open the vent and reduce the output signal to the vent pressure. The device may be arranged for limiting either the high or the low limit of the preselected output signal operating range.

8 Claims, 14 Drawing Figures

PNEUMATIC OUTPUT SIGNAL LIMITING DEVICE

FIELD OF THE INVENTION

This invention relates to pneumatic instrumentation apparatus for industrial processes. More particularly this invention relates to force and pressure-responsive devices of the so-called planar-type and especially to such devices for limiting output signals.

DESCRIPTION OF THE PRIOR ART

Pneumatic devices utilizing planar-type multi-layer laminated sandwich structures are described in the following U.S. Patents:

3,573,778
3,590,694
3,593,734
3,812,767

A planar-type pneumatic device used as one element in a pneumatic system of an industrial process controller is disclosed in U.S. Pat. No. 3,717,162.

One of the uses of the pneumatic output signal limiting device of this invention is in the pneumatic circuit of an industrial process controller to prevent reset "wind-up" when controlling the start-up of a process or for controlling batch type processes. The following patents disclose pneumatic devices used to modify the output signals of industrial process controllers:

British Pat. No. 671,337
U.S. Pat. No. 2,705,017
U.S. Pat. No. 2,973,772

SUMMARY OF THE INVENTION

This invention is directed to a pneumatic output signal limiting device which utilizes a planar-type multi-layer laminated sandwich construction. This construction has many advantages over conventional construction; such as, a reduction in size, a favorable low spring rate, low internal volume for fast response with low consumption of fluid, and manufacturing economy. In addition to these advantages, this invention utilizes the planar-type construction to solve problems heretofore present in typical conventional construction.

In such conventional constructed pneumatic output signal limiting device a valve in the output signal chamber has been attached to a biased diaphragm associated with the input signal chamber and movement of the valve by the diaphragm in one direction closed the passage between the two chambers and movement in the opposite direction closed the vent in the output signal chamber. With this construction, the device tends to oscillate at the trip point causing excess consumption of fluid and excessive wear and fatigue of parts. Attempts to eliminate oscillation has usually resulted in a design which locked-up under certain operating conditions.

One feature of the present invention is a passage in the balance beam which provides communication between the inlet signal chamber and the outlet signal chamber. In typical conventional construction, the balance beam must be relatively massive to provide sufficient strength to eliminate bending under the forces applied to it. Using ordinary machining methods would entail the difficult and costly operation of drilling a deep hole longitudinally in the balance beam, plus two holes at right angles to the deep hole and inserting a plug in the open end of the deep hole. Another construction for providing a passage from a stationary part to the movable balance beam is to use a flexible tube. This entails drilling operations and methods for sealing the joint between the ends of the tube and the other parts. Not only does this construction increase the mass of the moving parts, but adds to the spring-rate of the device.

In commercial devices, it is important to provide a construction which may be easily modified to adapt it for a variety of uses. For example, one model may be required for a high limit trip point and another model for a low limit trip point. In either model it may be desirable to substitute a pneumatic set trip point signal for a manually adjustable spring or to provide an adjustable bias of the vent at some value above atmospheric pressure.

It is an object of this invention to provide a pneumatic output signal limiting device which provides a preselected dead space in operation to eliminate oscillation at its trip point.

It is another object of this invention to provide such a device in which a passage through a pivotable balance beam for communication from the input signal chamber to the output signal chamber can be economically produced without increasing the spring-rate of the device.

It is a further object of this invention to provide such a device which achieves the advantages of planar-type construction.

It is still another object of this invention to provide a construction for such a device that is easily and economically modified to adapt it for a variety of modes of operation.

These objectives are achieved by utilizing a planar-type construction in which the middle layer comprises a multi-layer laminated assembly having a balance beam. One important feature of this invention is the passage in the balance beam which provides communication between the inlet signal chamber and the output signal chamber. Using this construction, it is possible to provide more economically a relatively long passage having minimum volume than could be provided by conventional double diaphragm structures. Similarly, it is possible to provide economically the perpendicular outlet sections of the passage at both ends thereof with the position of the opening in the output signal chamber in a position to cooperate with the valve in that chamber. Using the planar-type construction, the passage is achieved with a minimum mass and without adding to the spring-rate of the balance beam.

Another important feature of this invention is the manner in which the valve operates. Once the balance beam contacts the valve, the flow of fluid through the passage is stopped. Further movement of the balance beam in the same direction moves the valve to open the vent in the output signal chamber is opposed by the valve biasing spring. By this arrangement, a preselected dead-space is provided which eliminates oscillation.

This invention provides a device which is easily and economically modified so as to change its mode of operation. It is possible to convert the device from using an adjustable spring to set the trip point to using a pneumatic signal merely by partially disassembling and removing the trip point spring, then substituting a sealing plug for the adjustable screw. In converting from a high trip point to a low trip point many of the parts and laminations in the middle layer are used in both models.

DESCRIPTION OF THE DRAWINGS

The objects and advantages of this invention will in part be pointed out and in part apparent from the following description considered together with the accompanying drawings.

DESCRIPTION OF THE PREFERRED EMBODIMENT

Figure 1:
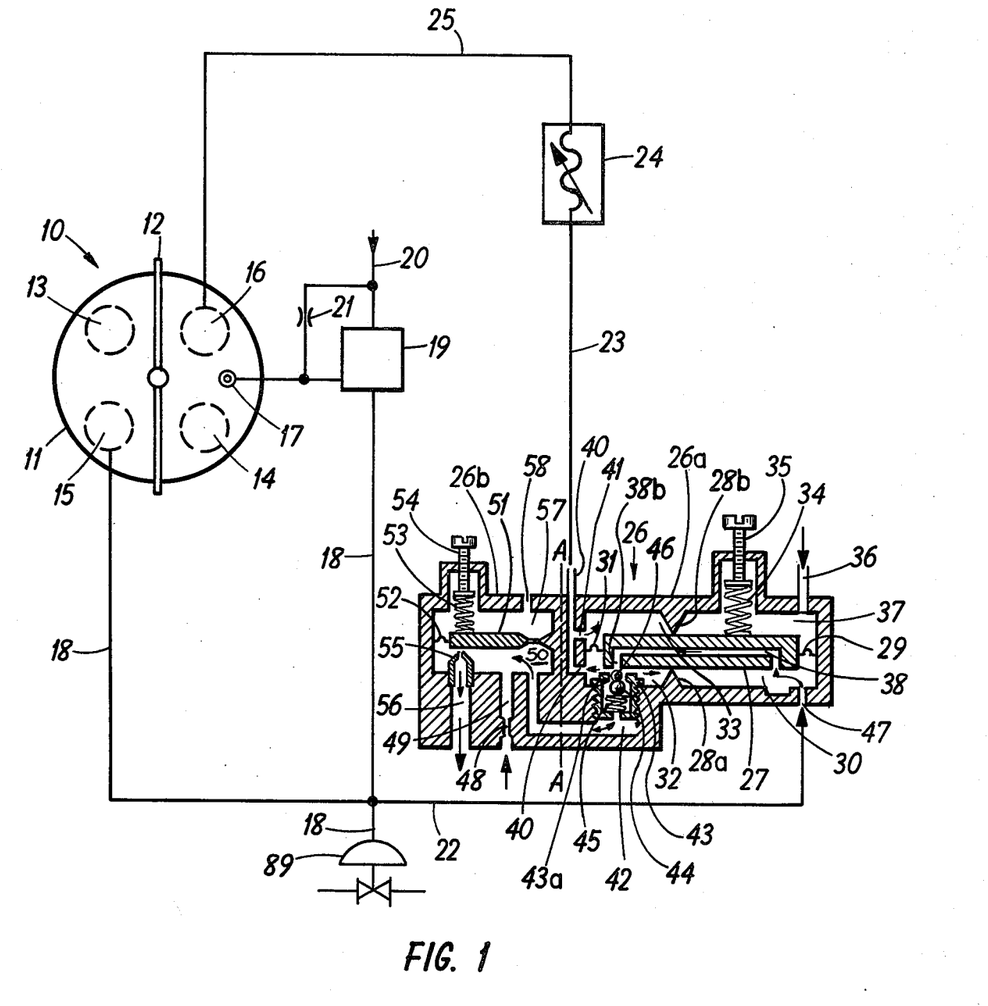
FIG. 1. A diagramatic representation of the pneumatic output signal limiting device of this invention shown in the feedback circuit of an industrial process controller to prevent the phenomenon known as "wind-up" from occuring when the controller is used to control a batch-type process.

Referring to FIG. 1, a diagramatic representation of the pneumatic output signal limiting device is shown in the feedback circuit of an industrial process controller to provide a basic understanding of the organization and operation of the device in a typical application. It is understood that the invention resides in the device and not the application used to explain its organization and operation. The industrial process controller 10 illustrated herein may be the type described in U.S. Pat. No. 2,742,917. The controller 10 is a force balance two mode type having a balance plate 11 mounted for pivotal movement about adjustable proportional band fulcrum 12. The balance of forces exerted against the balance plate 11 by the pressure signals in the measurement bellows 13, set point bellows 14, feedback bellows 15 and reset bellows 16 is detected by nozzle 17. The angular position of the fulcrum 12 establishes the proportional band of the controller 10. Fluid at a constant pressure is supplied through conduit 20 to relay 19 and through supply restriction 21 to nozzle 17. The pressure signal from nozzle 17 regulates the output signal from relay 19 which is fed through output signal conduit 18 to feedback bellows 15 and to a final element 89 such as a pneumatically actuated process value. For normal use, the output signal from relay 19 is connected through output signal conduit 18 and branch conduits 22 and conduit 23 to adjustable reset restrictor 24, and thence through reset conduit 25 to reset bellows 16. The controller 10 thus far described operates in a well known manner.

When the controller 10 is connected in the manner described above for normal use, during the time in which the process may be off control or shut down for long periods, the reset circuit will saturate and stabilize at either the supply pressure or atmospheric pressure depending on the action and direction of the error. The common term for this condition is wind-up. After the process is restarted, measurement overshoot of the set point can occur unless precautions are taken. The pneumatic output signal limiting device 26 is added to prevent this overshoot. The output signal from relay 19 is fed through output signal conduit 18 and branch conduit 22 to the input signal passage 47 of device 26 and the output signal from output signal passage 40 is fed through conduit 23 to adjustable reset restrictor 24. The above discusses a high signal limiting device. A lower signal limiting device will be discussed later herein.

The portion of device to the right of line AA is the basic pneumatic output signal limiting device 26a of this invention. The portion to the left of line AA is a pressure regulator 26b which modifies the operation of the basic device 26a. The output signal from the relay 19 of controller 10 serves as the input signal to the basic portion 26a. The device 26a is the basic output signal limiting device which may be used independent of the pressure regulator 26b. In the basic output limiting device 26a, a balance beam 27 is mounted for pivotal movement about fulcrums 28a and 28b. The portion of balance beam 27 to the right of fulcrums 28a and 28b together with diaphragm 29 form a movable common wall between input signal chamber 30 and bias signal chamber 37. The portion of balance beam 27 to the left of fulcrums 28a and 28b together with diaphragm 31 form a movable common wall between output signal chamber 32 and second output signal chamber 33. As shown, a spring 34 is adjustable by screw 35 to exert a biasing force against balance beam 27 in opposition to the force exerted against the movable wall by the input signal in chamber 30. When using the spring 34 and screw 35 to adjust the trip point of the device 26a, bias signal chamber 37 is vented through bias signal passage 36. Alternately, the spring 34 may be removed, the screw 35 sealed and a biasing signal feed into bias signal chamber 37 through bias passage 36 to apply the biasing force against the movable wall.

A passage 38 extends through balance beam 27 past the pivotable axis thereof to provide communication from input signal chamber 30 to outlet signal chamber 32. Second output signal chamber 33 is in communication with output signal chamber 32 through output signal passage 40 and branch passage 41 to chamber 33 so as to maintain the output signal equal in both chambers and thus eliminate any forces exerted on the balance beam by the output signal. Passage 40 also provides for communication between the output signal chamber and a utilization circuit, such as, for example, the reset circuit of controller 10.

In output signal chamber 32, a vent valve assembly 43 is mounted in vent passage 42. A movable spherical plug 44 is biased upwardly against seat 43a by spring 45. A second smaller spherical plug 46 is fastened to plug 44 and positioned to extend upwardly into output signal chamber 32 in line with the open end 38b of passage 38 so that plug 46 closes passage 38 upon movement of the balance beam 27 into contact with the plug 46. The vent passage 42 may open to a vent pressure which may be atmospheric pressure or the bias pressure from the chamber 50 of the pressure regulator 26b.

The pressure regulator 26b receives fluid in chamber 50 from a constant pressure source through restrictor 48 and supply passage 49. Cantilever beam 51 and diaphragm 52 form a movable common wall between chamber 50 and bias signal chamber 57. As shown, a spring 53 is adjustable by screw 54 to exert a biasing force against cantilever beam 51 in opposition to the force exerted against the movable wall by the pressure in chamber 50. Inasmuch as the screw 54 is not sealed, chamber 57 remains at atmospheric pressure. The orifice in nozzle 55 and vent passage 56 provide communication from chamber 50 to the atmosphere. In operation, the pressure in chamber 50 is maintained at the value determined by the adjustment of the force of spring 53 by the bias screw 54 which brings the surface of cantilever beam 51 into the proximity of nozzle 55 in a well known manner.

Referring now to the basic device 26a, an input signal is fed through passage 47 into input signal chamber 30, thence through passage 38 in balance beam 27. When the input signal is below the preselected limit or trip point established by the adjustment of screw 35, the input signal flows into output chamber 32, through passages 40 and 41 into chamber 33, and through passage 40 to the reset circuit of controller 10. When equilibrium is reached, the output signal equals the input signal. When the input signal equals the trip point, the balance beam 27 is moved in a counterclockwise direction into contact with the second spherical plug 46, covering the open end 38b to stop the flow through passage 38 and maintain the output signal equal to the trip point. The balance beam 27 remains in contact with second spherical plug 46 when the input signal exceeds the set point and the output signal is maintained equal the trip point until the input signal exceeds the trip point sufficiently to overcome the bias force exerted against the balance beam 27 by the spring 45 of the vent valve 43. When this condition is reached, then balance beam 27 moves further in the counterclockwise direction to move spherical plug 44 away from seat 43a, reducing the output signal to atmospheric pressure when passage 42 communicates with the atmosphere or to the pressure of the bias signal when the pressure regulator 26b is used.

An idealistic description of the use of the pneumatic output signal limiting device 26a and bias vent pressure applied by the pressure regulator 26b is presented in the article "Effective Control for Automatic Startup and Plant Regulation" by F. G. Shinskey in the April 1973 issue of "Canadian Controls and Instrumentation". In practice, the operation is substantially as described by Shinskey with the addition of the dead-space provided by the biasing spring 45, which may be in the order of a fraction of 1 psi depending upon the force of the spring selected.

Figure 5A:
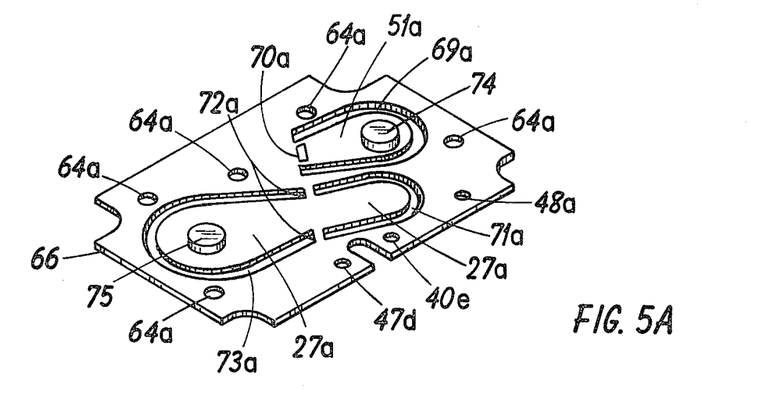
FIGS. 5a–c. A plan view of each of the layers of the multi-layer laminated assembly shown in FIGS. 3 and 4, with the layers oriented for ready comparison to the adjacent parts shown in FIG. 4.
Figure 5B:
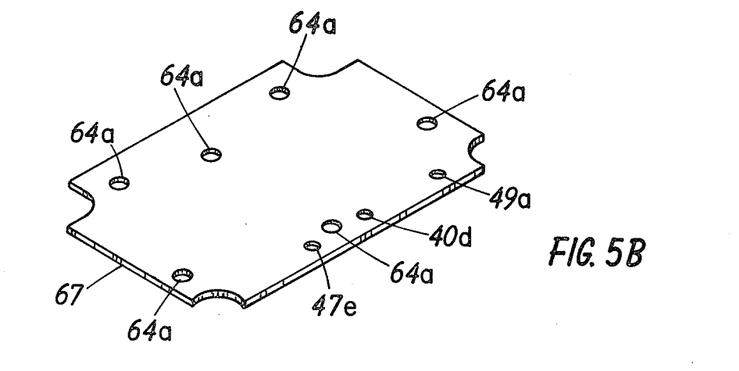
Figure 5C:
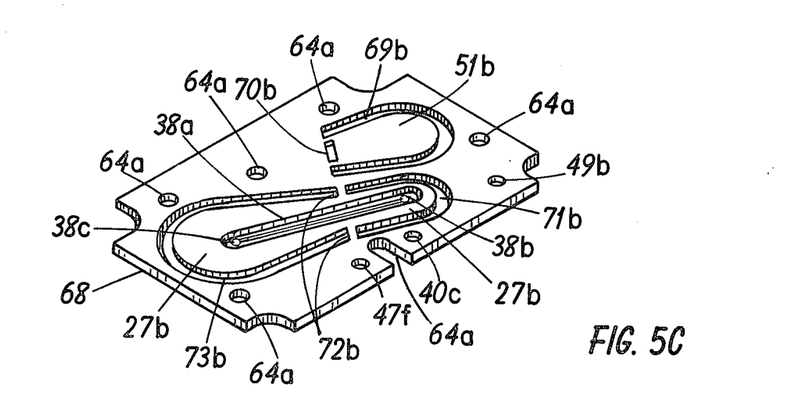
Figure 6:
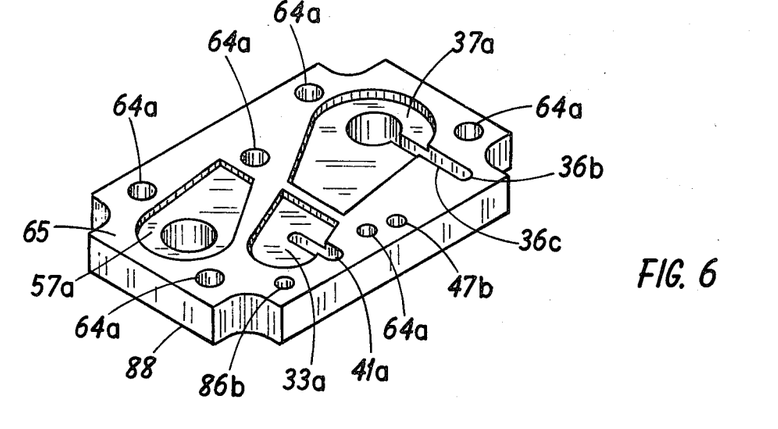
FIG. 6. A perspective view of the bottom surface of the cover oriented for ready comparison to the adjacent parts shown in FIG. 4.
Figure 7A:
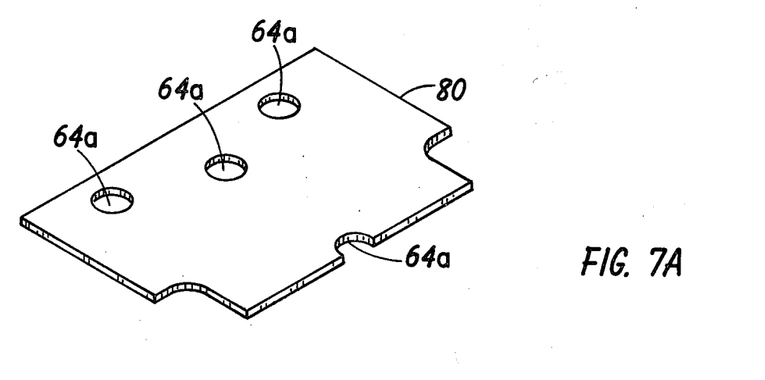
FIGS. 7a and b. A perspective view of the bottom plate and the bottom surface of the base oriented for ready comparison to the parts shown in FIG. 4.
Figure 7B:
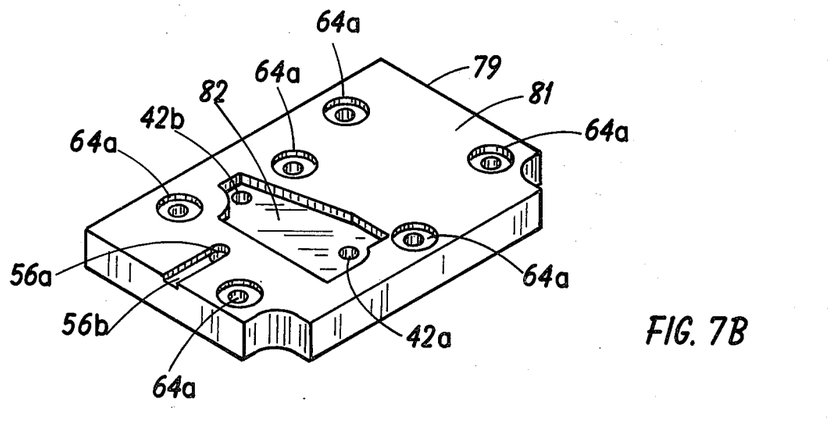

Now turning to FIGS. 3–7, the planar-type construction of the pneumatic output signal limiting device 26 will be described. The device 26 may be described as a sandwich having a base assembly 59 and a cover assembly 63 with a gasket 60, a multi-layer laminated assembly 61 and a second gasket 62 imposed in that order therebetween. The device 26 is held together by screws 64. Each layer of the multi-layer laminated assembly is shown in FIGS. 5a–c. The bottom surface 81 of the base 79 and bottom plate 80 of base assembly 59 are shown in FIGS. 7a and 7b. The bottom surface 65 of cover assembly 63 is shown in FIG. 6. In all the figures, the surfaces of the parts are oriented for ready comparison with FIG. 4.

The multi-layer laminated assembly 61 comprises generally of an upper layer 66, a resilient diaphragm layer 67 and a bottom layer 68. The upper and bottom layers 66 and 68 are made of a relatively stiff springy material. The upper layer 66 has a horseshoe shaped slot 69a with a rectangular slot 70a at the open end of the horseshoe slot 69a to form cantilever portion 51a of the cantilever 51 of the pressure regulator 26b. The bottom layer 68 has a horseshoe shaped slot 69b with a rectangular slot 70b at the open end of the horseshoe slot 69b to form cantilever portion 51b of the cantilever 51. The horseshoe shaped slot 69a and 69b and rectangular slots 70a and 70b are of the same size and shape and located so when the upper layer 66 and bottom layer 68 are laminated to each side of the resilient diaphragm layer 67, the cantilever portions 51a and 51b act as a single cantilever 51. The upper layer 66 also has horseshoe shaped slots 71a and 73a extending in opposite directions from the open ends thereof and spaced apart to form flexures 72a. The bottom layer 68 also has horseshoe shaped slots 71b and 73b extending in opposite directions from the open ends thereof and spaced apart to form flexures 72b. The horseshoe shaped slots 71a, 71b, 73a and 73b are of the same size and shape and located so when laminated to each side of the resilient diaphragm layer 67, the portions 27a and 27b inside the horseshoe shaped slots 71a, 71b, 73a and 73b act as a single balance beam 27 pivoting about the axis of flexures 72a and 72b. The bottom layer 68 includes a shallow groove 38a lengthwise in portion 27b of balance beam 27 with a hole 38b at one end and hole 38c at the other end of the groove. Bottom layer 68 may be made of a single piece of metal and have the groove etched thereon as shown in FIG. 5c. When the bottom layer 68 is laminated to resilient diaphragm layer 67, the groove 38a is covered to form, with holes 38b and 38c, the passage 38. The multi-layer laminated assembly 61 is completed by cementing spring guide 74 to the surface of the cantilever portion 51a at the center of the rounded end of the horseshoe shaped slot 69a and cementing spring guide 75 to the surface of balance beam 27a at the center of the rounded end of the horseshoe shaped slot 73a.

Figure 2A:
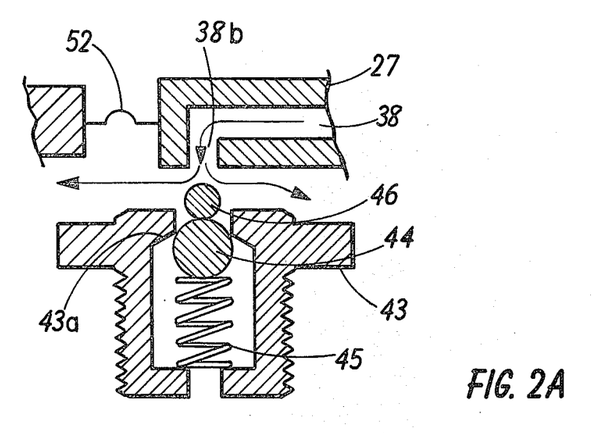
FIGS. 2a–c. Cross-sectional view of the end of the balance beam and the vent valve in the output signal chamber of the device shown in three operating conditions.
Figure 2B:
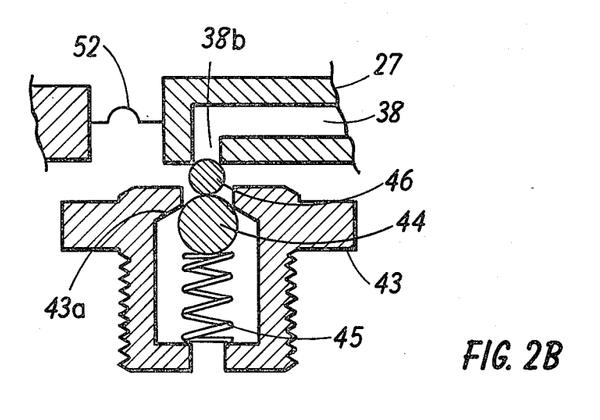
Figure 2C:
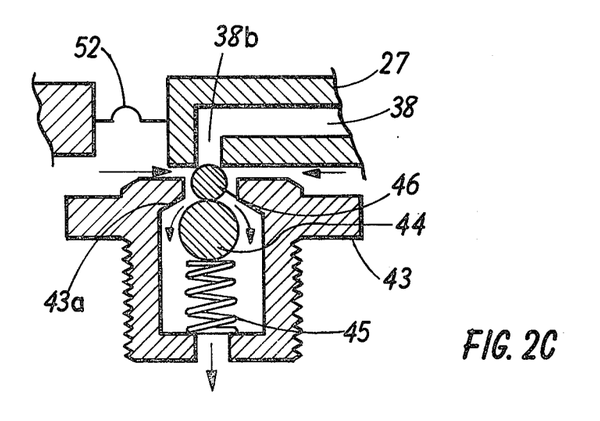
Figure 3:
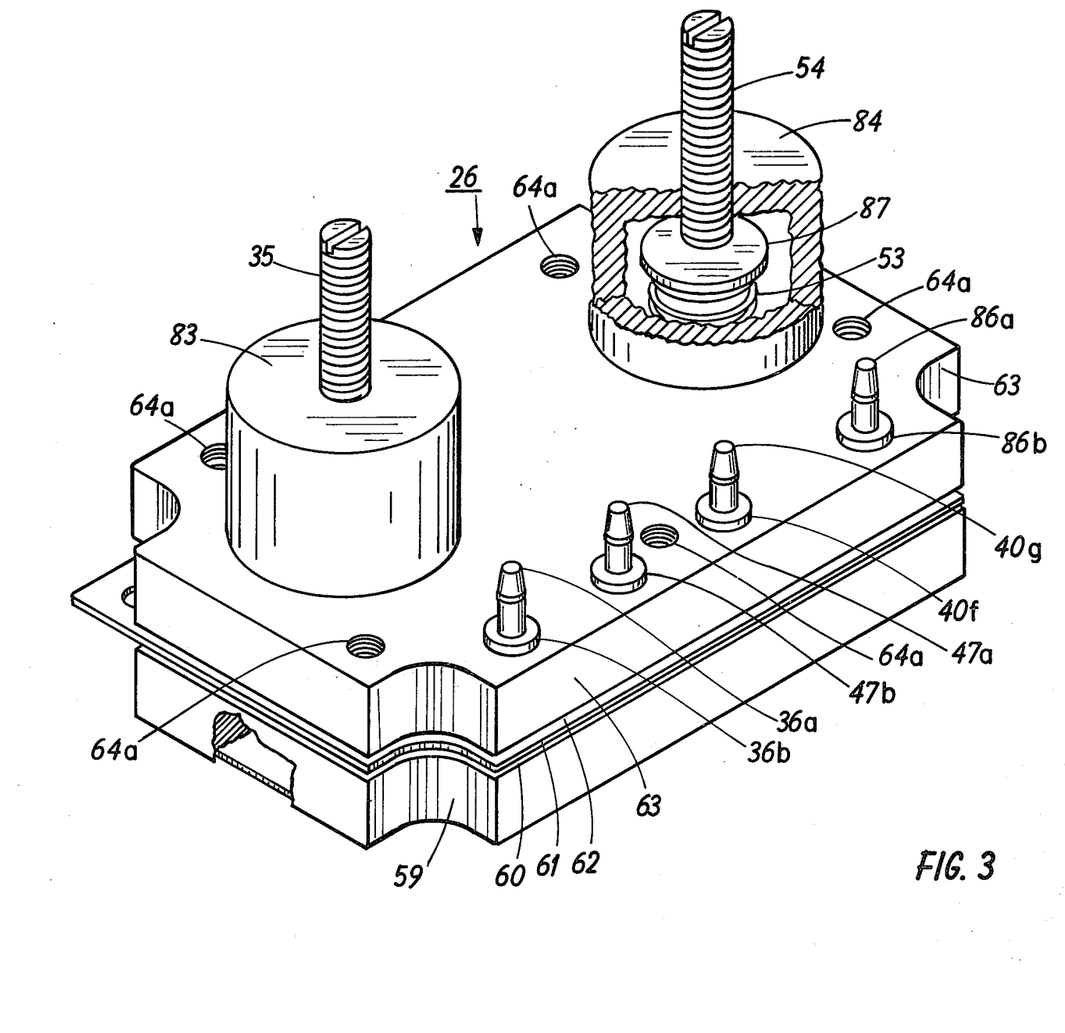
FIG. 3. A perspective view of an embodiment of the invention.
Figure 4:
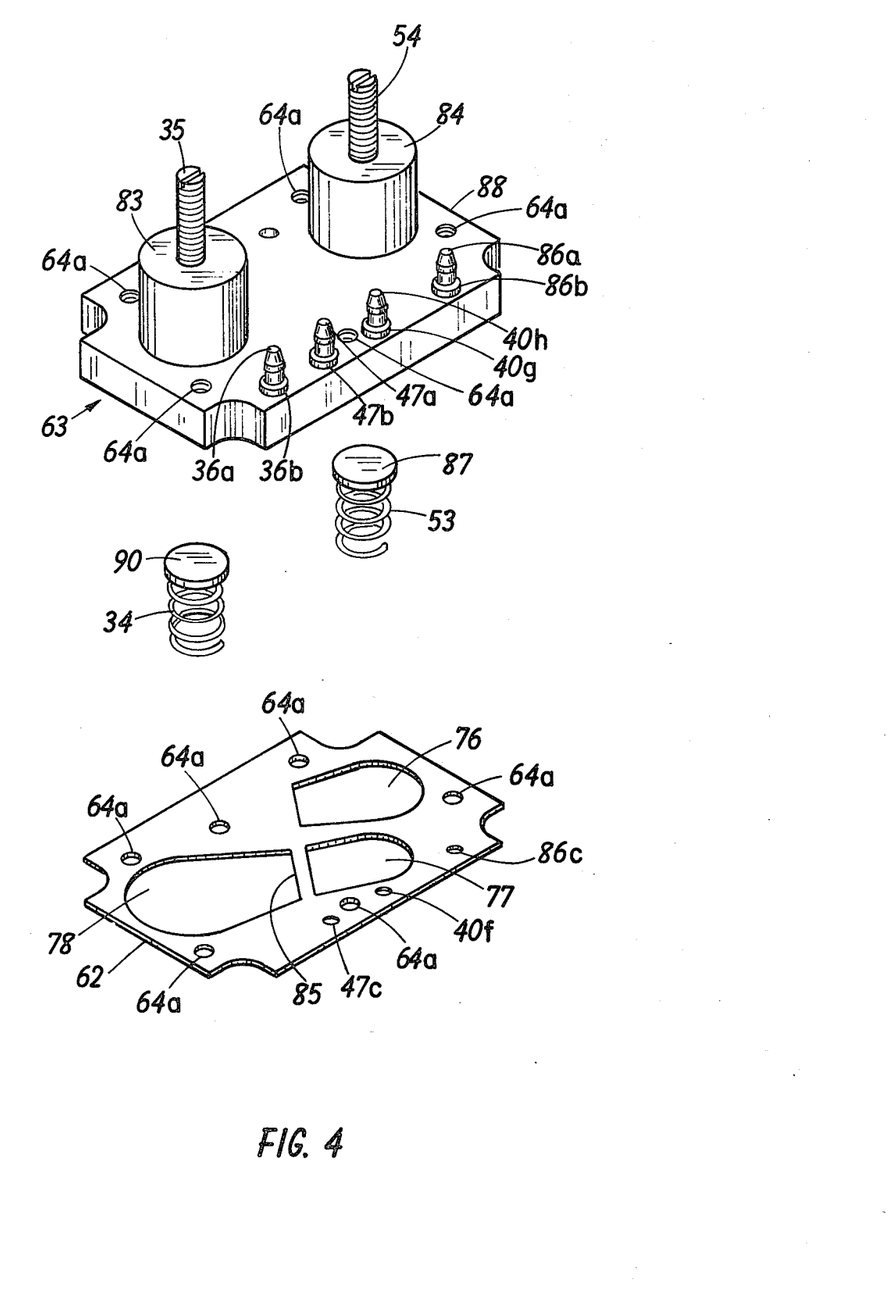
FIG. 4. An exploded view of the device shown in FIG. 3.

The base assembly 59 comprises a base 79, a bottom plate 80, a vent valve assembly 43 and a nozzle 55. The base 79 has on its upper surface a horseshoe shaped shallow recess 50a corresponding in contour and size with the outer permeter of horseshoe shaped slots 69a and 69b in upper layer 66 and bottom layer 68 respectively, which forms, in cooperation with the sections of the multi-layer laminated assembly 61 directly thereover, chamber 50 of the pressure regulator 26b. The base 79 also has on its upper surface horseshoe shaped shallow recesses 30a and 32a corresponding in contour and size with the outer permeter of horseshoe shaped slots 71a, 73a and 71b, 73b, in the upper layer 66 and bottom layer 68 respectively, which form, in cooperation with the section of the multi-layer laminated assembly 61 directly thereover, input signal chamber 30 and output signal chamber 32. A cross-section of the vent valve assembly 43 is shown in FIGS. 2a–c. The vent valve assembly 43 is inserted in the upper end of vent passage 42a (See FIG. 7b) located at center of the round end of the horseshoe shaped shallow recess 32a.

A space between the ends of horseshoe shaped shallow recesses 30a and 32a forms a fulcrum surface 28b. Nozzle 55 is mounted in vent passage 56a (See FIG. 7b). Referring to FIG. 7b, the bottom surface 81 of base 79 is shown. A shallow recess 82 is provided with a passage 42b communicating with the upper surface of base 79 in horseshoe shaped shallow recess 50a. The purpose of shallow recess 82 and passage 42b will be explained later herein. A slot 56b extends from vent passage 56a to the edge of base 79. Bottom plate 80 shown in FIG. 7a is cemented to the bottom surface 81 of base 79 covering shallow recess 82 to form a capacity chamber and covers slot 56b to form the vent passage 56 for venting fluid to the exterior of base 79.

The cover assembly 63 comprises a cover 88 having on the upper surface thereof bosses 83 and 84. In the center of each of bosses 83 and 84 are adjusting screws 35 and 54. The cover assembly 63 also includes passages 36b, 47b, 40g and 86b into which are inserted nipples 36a, 47a, 40h and 86a for providing means for attaching conduits to the device 26. Referring to FIG. 6, the bottom surface 65 of cover 88 has horseshoe shaped shallow recesses 57a, 33a and 37a which correspond in contour and size with the outer perimeters of the horseshoe shaped slots 69a, 69b, 71a, 71b and 73a, 73b in the upper layer 66 and bottom layer 68 of the multi-layer laminated assembly 61. Shallow recesses 57a, 33a and 37a form, in cooperation with the sections of the multi-layer laminated assembly 61 directly thereover, bias signal chamber 57, second output signal chamber 33 and bias signal chamber 37.

Gaskets 60 and 62 have openings 76, 77, and 78 which correspond in contour and size respectively to the horseshoe shaped shallow recesses 50a, 37a, 30a in the base 79 and to the horseshoe shaped shallow recesses 57a, 33a and 37a in the cover 88. An area 85 in gaskets 60 and 62 corresponds in position to fulcrum surface 28b of base 79 and fulcrum surface 28a of cover 88.

The device 26 is assembled with spring end 87 abutting the inner end of screw 54 and spring 53 positioned at one end by the reduced diameter section at the lower end of spring end 87 and at the other end by spring guide 74. In like manner, spring end 90 abuts the inner end of screw 35 and spring 34 is positioned at one end by the reduced diameter section at the lower end of spring end 90 and at the other end by spring guide 75. In the assembled device 26, the flexures 72a and 72b are clamped in contact with the area 85 of the gaskets 62 and 60 respectively and supported by fulcrum surface 28a and 28b respectively on the cover 88 and base 79. Also in the assembly, the hole 38b in cantilever portion 27b of cantilever beam 27 is in position to move into contact with the second spherical plug 46 of the vent valve assembly 43 to stop the flow of fluid through the passage 38 and cantilever portion 51b is in position to move into contact with nozzle 55 to regulate the flow of fluid through vent passage 56.

The parts and passages in the embodiment disclosed in FIGS. 3–7 have the same identifying numerals as those in the diagramatic representation in FIG. 1 to enable the reader to make comparisons. In FIGS. 3–7, the input signal is fed through passage 47 comprising nipple 47a, passage 47b in cover 88, hole 47c in gasket 62, hole 47d in upper layer 66, hole 47e resilient diaphragm 67, hole 47f in bottom layer 68, hole 47g in gasket 60, and groove 47h into input signal chamber 30. The passage 38 providing communication between input signal chamber 30 and output signal chamber 32 is formed, in part, by the resilient diaphragm layer 67 covering groove 38a in the bottom layer 68 and comprises the hole 38b, the covered groove 38a and hole 38c. The passages 40 and 41 providing communication between output signal chamber 32 and second output signal chamber 33 comprises groove 40a in base 79, hole 40b in gasket 60, hole 40c in bottom layer 68, hole 40d in resilient diaphragm 67, hole 40e in upper layer 66, hole 40f in gasket 62 and groove 41a in cover 88. The passage 40 continues through passage 40g in cover 88 and nipple 40h. The vent passage 42 is in base 79 and comprises passage 42a from chamber 32 through vent valve assembly 43 into a capacity chamber formed by cementing bottom plate 80 to base 79 to enclose shallow recess 82, and from chamber 82a through passage 42b into chamber 50 of the pressure regulator. Fluid at constant pressure is supplied to chamber 50 through nipple 86a and passage 86b in cover 88 through hole 86c in gasket 62, to restrictor 48a in the upper layer 66 and thence to passage 49 comprising hole 49a in resilient diaphragm 67, hole 49b in bottom layer 68, hole 49c in gasket 60 and groove 49d in the base 79. Passage 56 which provides communication from chamber 50 to the atmosphere through nozzle 55 is in the base 79 and comprises hole 56a and groove 56b covered by bottom plate 80. The holes and slots 64a (all identified by the same symbol) are for receiving bolts 64. The passage 36 for introducing a trip point signal into chamber 37 comprises nipple 36a, and passage 36b and groove 36c in cover 88.

Note that capacity 82a has been added to the embodiment of device 26 disclosed in FIGS. 3–7. The capacity chamber 82a provides a time lag which stabilizes the pressure regulator 26b. In all other respects the device 26 is the same in operation as that described with respect to the diagramatic representation in FIG. 1.

Figure 8:
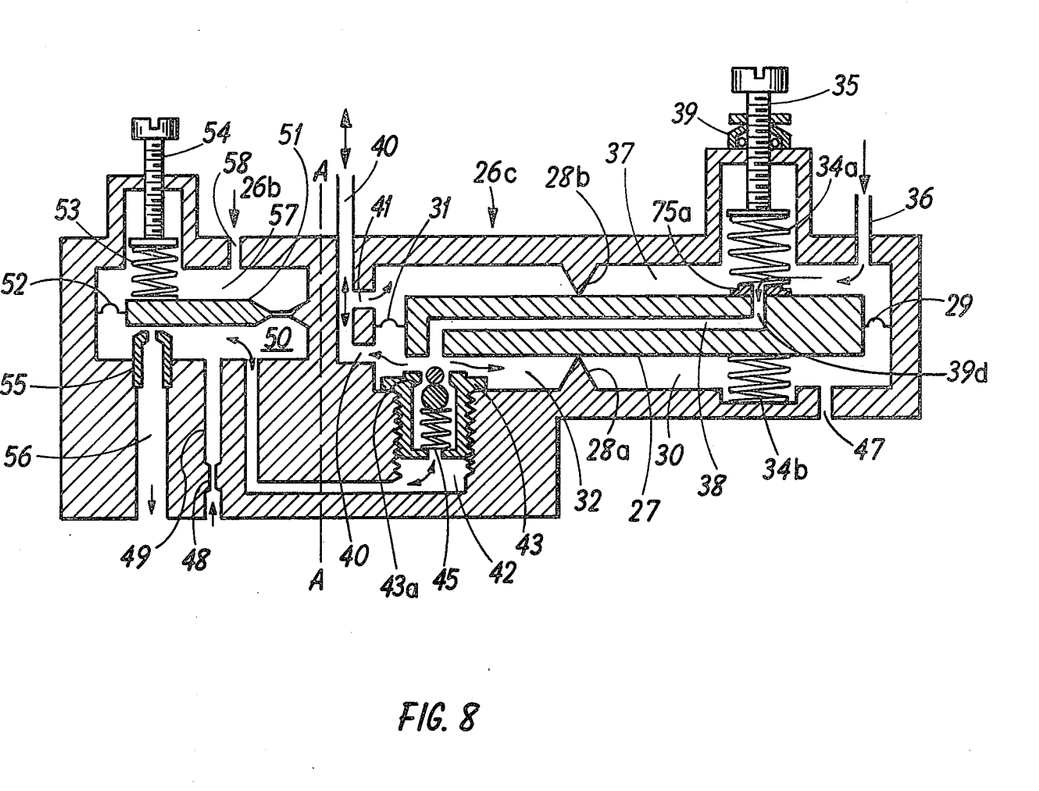
FIG. 8. A diagramatic representation of an embodiment of this invention adapted for limiting the minimum amplitude of the output signal of the device.

Referring to FIG. 8, the device 26c is arranged to operate on the low limit; i.e., the output signal pressure is limited to a minimum of 3 psi. The device 26c is identical in all respects to the device 26 disclosed in FIGS. 1–7 except the following modifications. The input signal is received through passage 36 into chamber 37 and chamber 30 is vented to atmosphere through passage 47. A seal 39 is provided to seal the threads of screw 35. A spring 34b is inserted in chamber 30 to oppose the forces applied to the movable wall by the spring 34a and the input signal pressure in chamber 37. Hole 38c is eliminated in bottom layer 68 and a hole 38d is provided in upper layer 66, a hole 39e (not shown) through resilient diaphragm 67, and through spring guide 75a so that passage 38 provides communication between chamber 37 and chamber 32.

The operation of the device 26a is identical to that of device 26 except that the output signal is limited to a minimum value of, for example, 3 psi and will not fall any lower other than the minimum value.

By using the planar-type construction described hereinabove, a commercial embodiment of the pneumatic output signal limiting device can be made having layers measuring in the order of 2 ⅞" × 1 ⅞". The upper layer 66 and bottom layer 68 may be manufactured economically by photo-etching the openings and grooves therein. By using the etching process, the relocation of the holes 38b and 38d is a simple matter of selecting the art work having the desired pattern thereon. The shallow recesses in the base 79 and cover 88 and the small passage 38 in the balance beam 27 insure small volumes and the resulting favorable speed of response.

Although the preferred embodiment of the invention has been described hereinabove having both an upper layer 66 and bottom layer 68, it is apparent that it may be constructed having a single layer. It is understood that those skilled in the art will make other modifications as required for particular applications without departing from the scope of the invention.

I claim:

1. A pneumatic output signal limiting device having a planartype laminated sandwich construction, comprising, in combination:
   a multi-layer laminated assembly having
   a resilient diaphragm layer and
   at least one relatively stiff spring layer
   said at least one relatively stiff springy layer having a stationary portion and a balance beam portion joined at a point between the ends thereof to said stationary portion by flexure axis portions for pivotal movement of said balance beam portion about the axis of said flexure portions.
   a passage extending through said balance beam portion having a first opening and a second opening on opposite sides of said axis;
   an input signal chamber having as one wall thereof that portion of said multi-layer laminated assembly which includes that end of said balance beam portion having said first opening and provided with sufficient space for movement of said balance beam portion;
   a passage into said input signal chamber adapted to receive an input signal;
   a means for applying a biasing force against said balance beam portion in opposition to the forces exerted against said wall portion of said multi-layer laminated assembly by the input signal in said input signal chamber;
   a first output signal chamber having as one wall thereof that portion of said multi-layer laminated assembly which includes that end of said balance beam portion having said second opening and provided with sufficient space for movement of said balance beam portion;
   a vent passage in said first output signal chamber for venting said first output signal chamber;
   a valve in said vent passage spring biased to a closed position and having an outwardly extending plug portion arranged to close said second opening of said passage extending through said balance beam portion upon movement of said balance beam portion in one direction and upon further movement in the same direction to open said valve;
   a fulcrum support means adapted to support said flexure portions;
   a second output signal chamber on the other side of said multi-layer laminated assembly from said first output chamber with sufficient space for movement of said balance beam portion;
   a passage providing communication between said first and second output signal chambers;
   an output signal passage out of said first output signal chamber for transmitting the output signal from said first output signal chamber.

2. A pneumatic output signal limiting device as claimed in claim 1, wherein said means for applying a biasing force comprises an adjustable spring.

3. A pneumatic output signal limiting device as claimed in claim 1 wherein said means for applying a biasing force comprises, in combination;
   a bias signal chamber on the other side of said multi-layer laminated assembly from said input signal chamber with sufficient space for movement of said balance beam portion and;
   a passage into said bias signal chamber for receiving a bias signal;
   whereby the bias signal in said bias signal chamber exerts a force against said wall portion of said multi-layer laminated assembly in opposition to force exerted there against by the input signal in said input signal chamber.

4. A pneumatic output signal limiting device as claimed in claim 1, wherein;
   said input signal chamber and said first output signal chamber are on the same side of said multi-layer laminated assembly,
   whereby the output signal is limited to a maximum amplitude related to the amplitude of said biasing force.

5. A pneumatic output signal limiting device as claimed in claim 4, wherein;
   when said input signal exceeds said limited maximum amplitude of said output signal, sufficiently to exert the added force of said bias spring of said valve, said output signal chamber is vented.

6. A pneumatic output signal limiting device as claimed in claim 1, wherein;
   said input signal chamber and said first output signal chamber are on the opposite sides of said multi-layer laminated assembly and of said axis,
   whereby the output signal is limited to a minimum amplitude related to the amplitude of said biasing force.

7. A pneumatic output signal limiting device as claimed in claim 5, wherein;
   said means for applying a biasing force comprises;
   a first spring adapted to apply said biasing force against said balance beam portion in opposition to the force exerted against said wall portion of said multi-layer laminated layer assembly by the input signal in said input chamber,
   a second spring adapted to apply a force against said balance beam portion in opposition to said biasing force applied thereto by said first spring, and
   means for adjusting the force applied by said second spring,
   whereby said upwardly extending plug portion of said valve closes said second opening of said passage extending through said balance beam when the algebraic sum of the forces exerted on said balance beam by said first and second spring and said input signal against said wall portion has attained a minimum value related to the adjustment of said second spring.

8. A pneumatic output signal limiting device as claimed in claim 1, including,
   means for applying a pre-selected back pressure to said vent passage.

* * * * *